(12) United States Patent  
Nishi et al.

(10) Patent No.: US 7,053,931 B2
(45) Date of Patent: May 30, 2006

(54) DIGITAL CAMERA WITH PRESET DATA RELATING TO IMAGE DATA

(75) Inventors: Nobuyuki Nishi, Nagano (JP); Yasumasa Nakajima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 641 days.

(21) Appl. No.: 10/052,911

(22) Filed: Jan. 23, 2002

(65) Prior Publication Data

US 2002/0097334 A1 Jul. 25, 2002

(30) Foreign Application Priority Data

Jan. 25, 2001 (JP) ............ P.2001-016918

(51) Int. Cl.
*H04N 5/225* (2006.01)

(52) U.S. Cl. .............. 348/207.2; 348/231.99; 348/333.01

(58) Field of Classification Search ........ 348/231.99, 348/231.1, 231.2, 333.01, 333.02, 207.2; 358/906, 909.1

See application file for complete search history.

(56) References Cited

U.S. PATENT DOCUMENTS

| | | | |
|---|---|---|---|
| 6,201,571 B1 * | 3/2001 | Ota ....................... 348/239 |
| 6,317,156 B1 * | 11/2001 | Nagasaki et al. ........ 348/373 |
| 6,715,003 B1 * | 3/2004 | Safai ..................... 710/33 |
| 6,724,502 B1 * | 4/2004 | Miyake et al. .......... 358/474 |
| 6,750,979 B1 * | 6/2004 | Kobayashi et al. ...... 358/1.14 |
| 2001/0005222 A1 * | 6/2001 | Yamaguchi ............. 348/223 |

FOREIGN PATENT DOCUMENTS

| | | | |
|---|---|---|---|
| JP | 2001-133874 A | | 5/2001 |
| JP | 2001122874 | * | 5/2001 |
| JP | 2002-23252 A | | 1/2002 |

* cited by examiner

*Primary Examiner*—David Ometz
*Assistant Examiner*—Gevell Selby
(74) *Attorney, Agent, or Firm*—Sughrue Mion, PLLC

(57) ABSTRACT

Printing the image data displayed on an LCD (38) and its print number or incrementing the print number by one can be specified only by depressing a DPOF dedicated switch (41) while the still image is being displayed on the LCD (38). For example, if the DPOF dedicated switch (41) is depressed when still image is being displayed in a reproduction mode, the print number of displayed image data is set to one, and if the DPOF dedicated switch (41) is depressed successively without changing the displayed image, the print number of the image data is set to two.

16 Claims, 6 Drawing Sheets

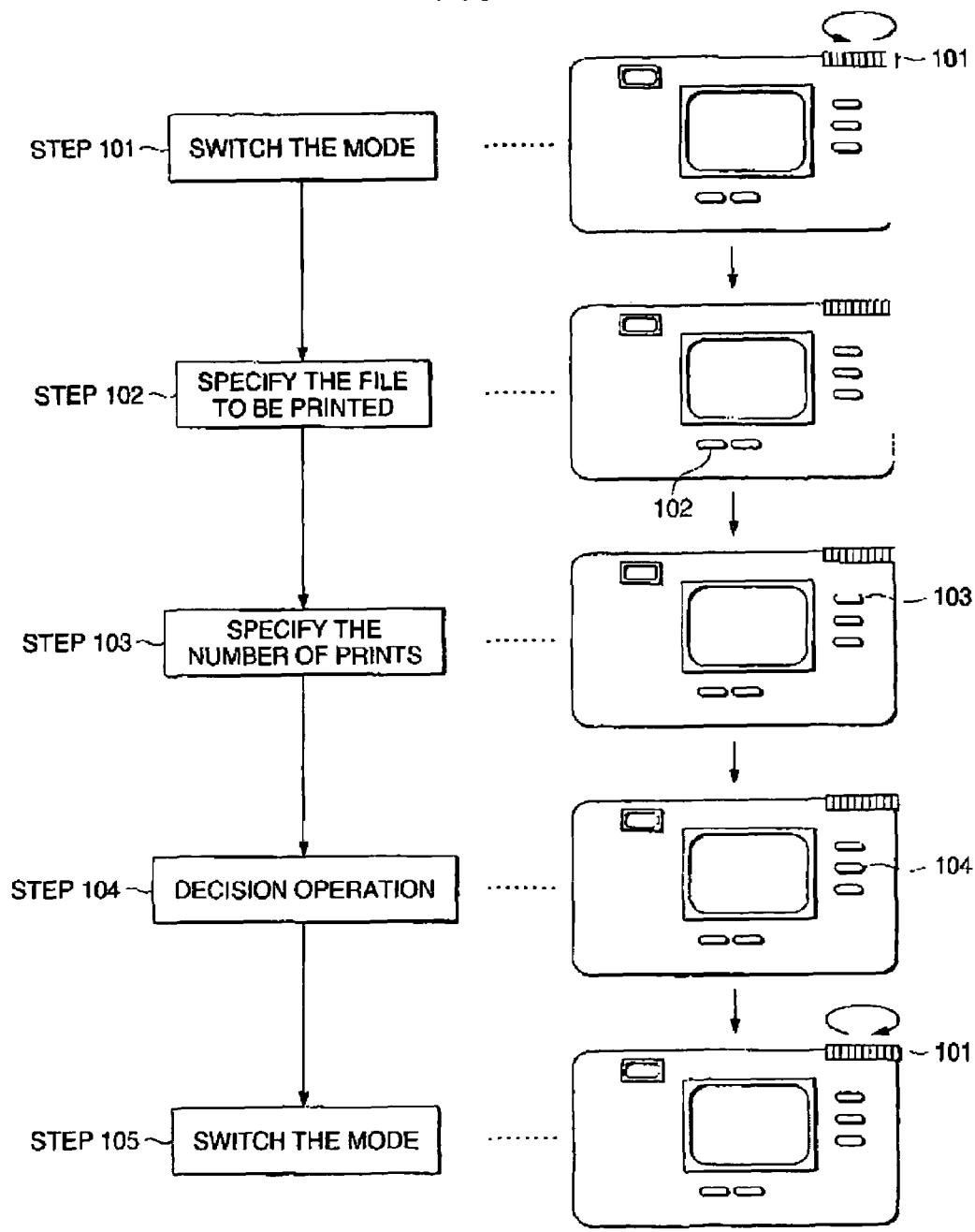

DIGITAL CAMERA WITH PRESET DATA RELATING TO IMAGE DATA

BACKGROUND OF THE INVENTION

The present invention relates to a digital camera, and more particularly to a digital camera with the preset data regarding the image data.

In recent years, along with the rapid spread of the digital camera, there is an increasing demand for utilizing an image through a removable memory between devices, such that the image captured by the digital camera is played by another digital camera, or output directly to the printer. For this demand, the file format for recording the image captured by the digital camera on a variety of kinds of removable memory has been standardized.

One of the file formats for recording the preset data regarding the image data is the DPOF (Digital Print Order Format) (Version 1.00) as released in 1999, and the DPOF (Version 1.10) was publicized in 2000. In the DPOF (Version 1.10), the specified data for an image file to be printed, the specified data for the number of prints, the specified data for the image file for automatic transmission, and the specified data for the image file for automatic reproduction can be recorded as the preset data. In the digital camera that supports the DPOF, a determination whether or not to print the data can be made, and the number of prints can be specified, while confirming the captured image on the LCD screen. In the digital camera, since the required information for printing or transmission is recorded before hand on the recording medium such as a memory card, there is no need of taking care about the file name or path name at the time of printing or transmission. Therefore, the DPOF is applied in various areas, including the laboratory print service or home printer, thereby making it easier to output the image data from the digital camera to the paper medium.

However, when a DPOF file such as an automatic print file is created or edited by the related digital camera, it is necessary that some operations is taken to switch from other modes such as a play mode to a specific mode for setting the DPOF, and another operation is taken to determine whether or not to select and print an image and specify the number of prints in the specific mode.

FIG. 9 shows one example of the operation for creating or editing an automatic print file in the related digital camera. For example, when an image desired for printing is found in a play mode, a dial switch 101 is firstly rotated to switch over to a DPOF setting mode to make the DPOF setting for the image (step 101). Then, a push button switch 102 is depressed in succession to change the displayed image and search for the image to be printed (step 102). Then, a push button switch 103 is depressed to set the number of printing the image (step 103). Then, a push button switch 104 is depressed to determine the setting content and create or edit the DPOF file (step 104). Then, the dial switch 101 is rotated to return to the play mode or photographing mode (step 105). In this manner, in the related digital camera, the operation of creating or editing the DPOF file is some complex.

SUMMARY OF THE INVENTION

The present invention has been achieved to solve the aforementioned problems, and it is an object of the invention to provide a digital camera that allows the preset data regarding the image data to be input and edited easily.

It is an other object of the invention to provide a digital camera that takes a short time to make the operation for preset data.

In order to solve the aforesaid object, the invention is characterized by having the following arrangement.

(1) A digital camera comprising:
   an input unit for inputting image data;
   a first storing unit for storing the image data in a nonvolatile recording medium in a predetermined file format;
   a display unit for displaying the image data stored in the nonvolatile recording medium;
   a dedicated interface unit for accepting input or edit of a preset data regarding the image data by one operation when the image data stored in the nonvolatile recording medium is displayed on the display unit; and
   a second storing unit for storing the preset data with the image data in the nonvolatile recording medium in a predetermined file format.

(2) The Digital Camera According to (1), wherein the preset data is data for setting number of printing the image data displayed on the display unit.

(3) The digital still camera according to (2), wherein the dedicated interface unit increments the number of printing the image data displayed on the display unit for every operation.

(4) The digital camera according to (1), wherein the dedicated interface unit includes a push button switch.

(5) The digital camera according to (4), wherein the push button switch is provided on the left with respect to the display unit.

(6) The digital camera according to (1) further comprising a memory unit for storing a copy of the preset data stored in the nonvolatile recording medium at least during a period for which said dedicated interface unit can accept the input or edit of the preset data.

Since the dedicated interface unit accepts the input or edit of the preset data regarding the image data by one operation, when the image data recorded on the nonvolatile recording medium is displayed on the display means, it is very easy to input and edit the preset data regarding the image data.

The phrase "accepting the input or edit of the preset data regarding the image data when the image data is displayed on the display means" means that the input or edit of the preset data can be accepted in a state where the image data is displayed on the display unit, and the input or edit of the preset data can be accepted by one operation in that state. More specifically, it means that when the digital camera is in the play mode and a specific image is displayed on the entire LCD screen, an automatic print file of the DPOF is created by one operation such as "depressing once" or "rotating once", or the number of prints recorded in the automatic print file is incremented. The term "dedicated" for the dedicated interface unit that the interface unit has any other functions than the function of accepting the input or edit of the preset data, therefore the dedicated interface unit is provided to enable the preset data to be clearly understood and easily utilized.

The preset data is the data for setting the number of printing the image data stored on the nonvolatile recording medium, therefore it is very easy to preset the number of printing the image data.

The dedicated interface unit increments the number of printing the image data displayed on the display means for every operation, therefore it is very easy to preset the number of printing the image data.

The dedicated interface means has a push button switch, therefore it is easy to designate the preset data while carrying the digital camera.

The pushbutton switch is provided near the display unit and on the left with respect to the display unit, therefore it is easy to designate the preset data while carrying the digital camera. More specifically, a plurality of switches are provided on the right with respect to the display unit in most cases, in which these switches may be operated by the dominant hand usually right hand except for the time of designating the preset data, and the preset data is designated with the undominant hand usually left hand, only when required, thereby resulting in simpler and easier operation.

The digital camera further comprises a memory unit for memorizing a copy of the preset data recorded on the nonvolatile recording medium at least during a period for which the dedicated interface means can accept the input or edit of the preset data, therefore the time for designating the preset data can be shortened. More specifically, when a processor built in the digital camera edits the preset data, for example, it is unnecessary to call the preset data from the nonvolatile recording medium into the memory unit, so that it takes a shorter time to designate the preset data.

BRIEF DESCRIPTION OF THE DRAWINGS

FIG. 9 is a typical diagram for explaining the preset operation for printing in the related digital still camera.

DETAILED DESCRIPTION OF PREFERRED EMBODIMENTS

Figure 1:
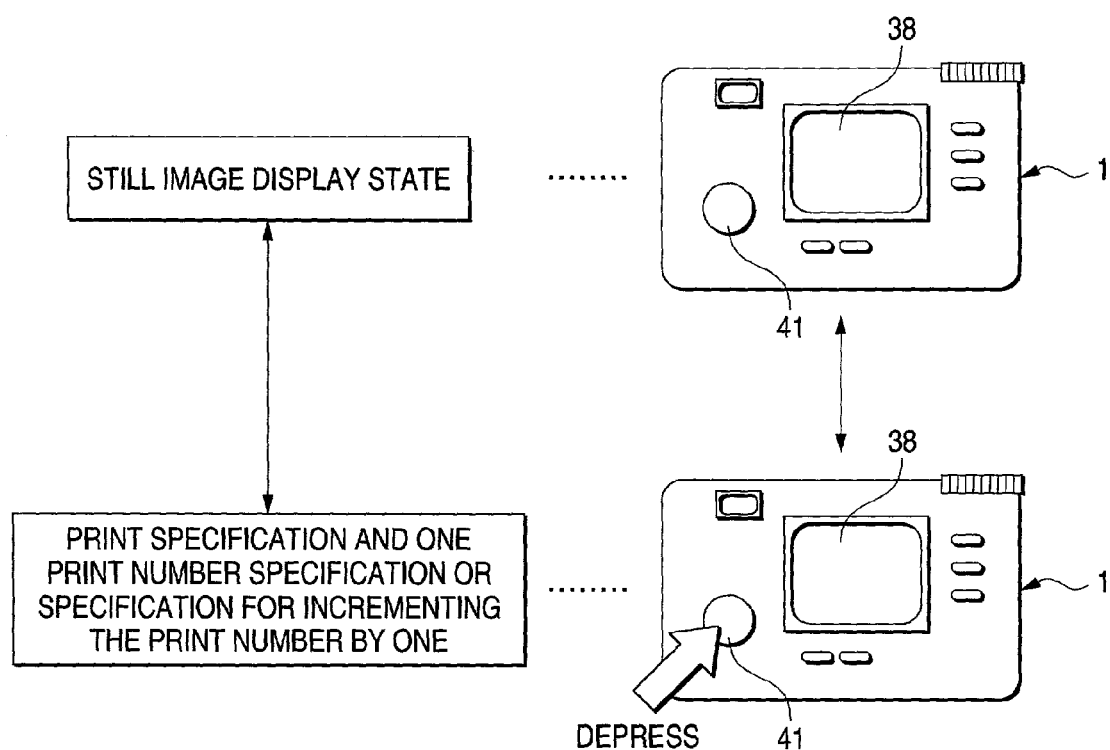
FIG. 1 is a typical view for explaining the preset operation for printing according to one embodiment of the present invention.

One embodiment of the present invention will be described below with reference to the accompanying drawings.

FIGS. 2, 3, 4 and 5 are a front view, a rear view, a plan view and a functional block diagram of a digital still camera according to the embodiment of the invention, respectively. An input unit as defined in the claims comprises an optical system 11, an area sensor 12, and an analog front end 13 (APE). A nonvolatile recording medium as defined in the claims comprises a removable memory 18. A first storing unit comprises an image generating section 14, a color space conversion section 15, a compression processing section 16, a file section 17, a CPU 20, and a memory device 19 (MS). A display unit as defined in the claims comprises the CPU 20 and a display unit 22. A dedicated interface unit as defined in the claims comprises a part of an operation section 21 including a DPOF specific switch 41. A second storing unit as defined in the claims comprises the CPU 20, the MS 19 and the file section 17. A push button switch as defined in the claims comprises the DPOF specific switch 41. A memory device as defined in the claims comprises the MS 19.

The optical system 11 is constituted by an optical lens, an infrared cut filter and an optical low-pass filter, and forms an image of a subject onto the area sensor 12.

The area sensor 12 is an optical sensor such as a CCD sensor or CMOS sensor having photo electric conversion elements, each photoelectric conversion element being provided with a complementary color filter of C (Cyan), M (Magenta), Y (Yellow) or G (Green). The filter may be a primary color filter for R (Red), G (Green) or B (Blue). The photoelectric conversion elements are arranged like a matrix. An analog signal of each color output from the area sensor 12 is input into an AFE 13.

The AFE 13 is constituted by a program gain amplifier, a CDS circuit and an A/D converter, and generates the digital data of 10 to 12 bits for each color of CMYG by sampling an analog signal output from each photoelectric conversion element. Each digital data for CMYG is input into the image generating section 14 directly or after being stored in a buffer memory.

The image generating section 14 is constituted by a hardware technique for controlling an ASIC (Application Specific Integrated Circuit) in which a predetermined algorithm is implemented by a logic circuit with the CPU 20, or by a software technique employing a DSP (Digital Signal Processor) engine. In the case where the ASIC is used for the image generating section 14, there is a merit that the processing can be faster than the case where the image generating section 14 is constituted by software technique. The image generating section 14 performs the automatic exposure (AE) processing, the automatic white balance (AWB) processing, the image generation processing, the conversion processing from the CMYG color space into RGB color space, and the γcorrection processing. The image generation processing as referred to herein mainly involves generating the image data having four values of CMYG colors for each pixel, employing the digital data representing the intensity of CMYG corresponding to an output of each photoelectric conversion element. The conversion processing from the CMYG color space into RGB color space is made by hardware technique with a 4×3 matrix operation processing circuit, or software technique using a multiplication circuit and an addition or subtraction circuit.

The color space converting section 15 is constituted by a 3×3 matrix operation processing circuit, or constituted by software technique under the control of the CPU 20 employing a multiplication circuit and an addition or subtraction circuit, and generates the YCbCr digital image data from the RGB digital image data by a linear transformation with a 3×3 matrix.

The compression processing circuit 16 is typically constituted by a hardware technique using a specific chip for the JPEG compression processing, but may be constituted by a software technique using the DSP. The compression processing section 16 performs the JPEG compression processing by the discrete cosine transform (DCT) or Huffman coding.

The file section 17 stores the compressed image data in a removable memory 18 such as a compact flash memory in the Exif file format.

The CPU 20 controls the optical system 11, the area sensor 12, the AFE 13, the image generating section 14, the color space conversion section 15, the compressing processing section 16, and the file section 17, and performs a reduction processing for the main image data made up of the YCbCr image data generated in the color space conversion section 15 to generate the thumb-nail image data of 160×120 pixels in the MS 19. Various processing performed by the image generating section 14, the color space conversion section 15 and the compression processing section 16 may be implemented by software technique in which predetermined programs are executed by the CPU 20.

Figure 2:
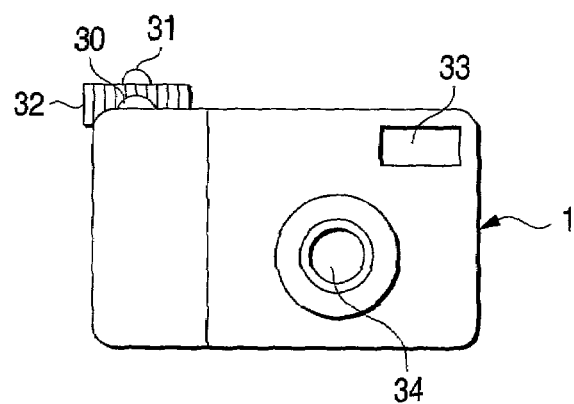
FIG. 2 is a front view of a digital still camera according to one embodiment of the invention.
Figure 3:
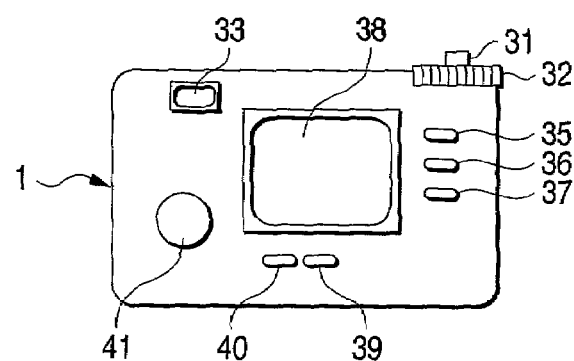
FIG. 3 is a rearview of the digital still camera according to one embodiment of the invention.
Figure 4:
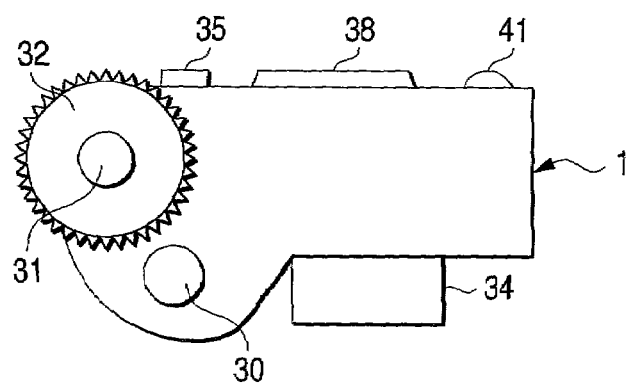
FIG. 4 is a plan view of the digital still camera according to one embodiment of the invention.
Figure 5:
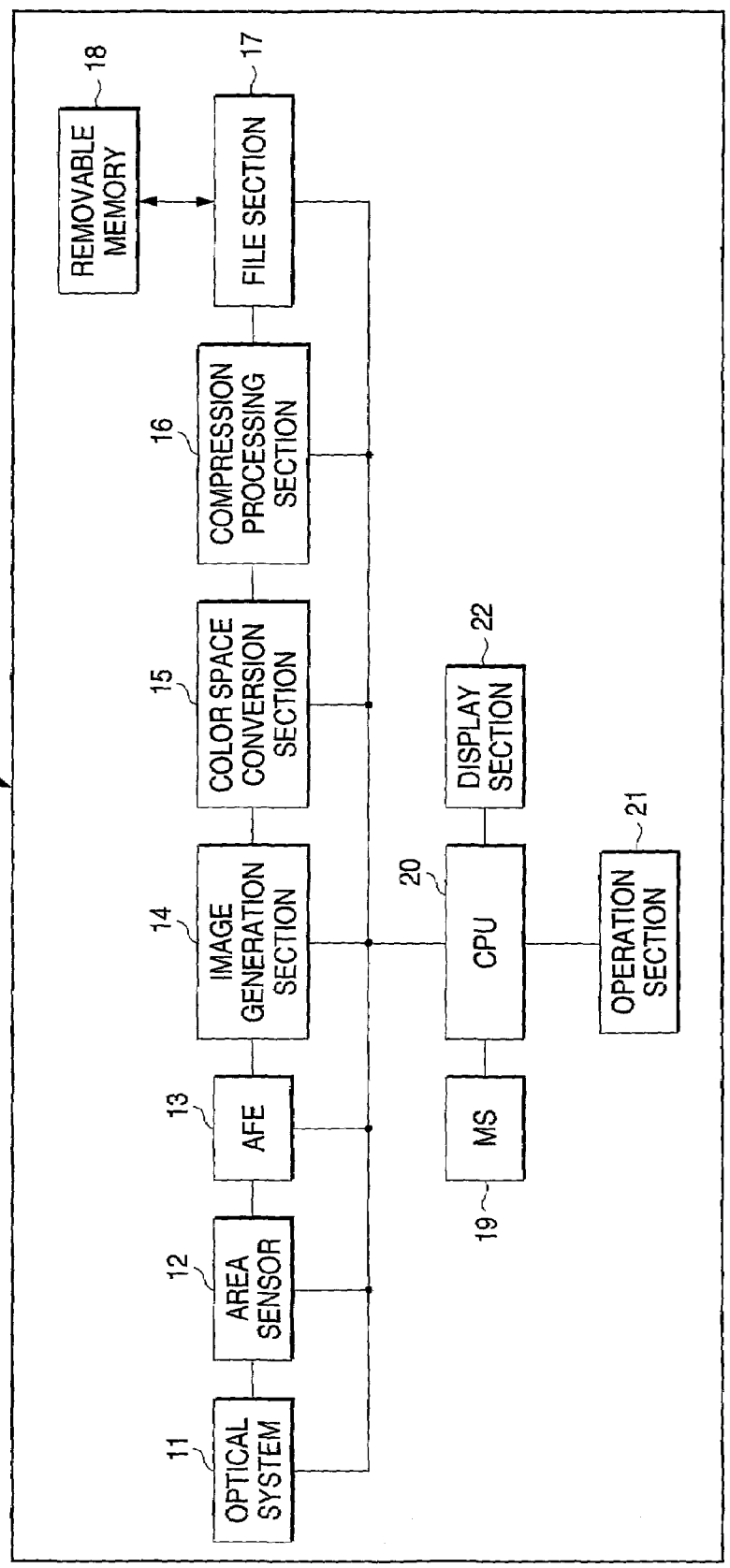
FIG. 5 is a block diagram of the digital still camera according to one embodiment of the invention.

The MS 19 temporarily stores the main image data made up of the YCbCr image data generated in the image generation section 14 and its reduced image data. The display section 22 is constituted by a video memory, an LCD (Liquid Crystal Display) 38 and a drive circuit, and displays the thumbnail image data generated by the CPU 20 on the LCD 38. The operation section 21 is constituted by a shutter button 30 provided on the upper surface of a case, a power supply switch 31, a dial switch 32, various setting switches 35, 36, 37, 39 and 40 provided round the LCD 38, a DPOF dedicated switch 41, and an input control circuit The DPOF dedicated switch 41 is a push button switch provided on the back face of the digital still camera I on the left with respect to the LCD 38. Moreover. FIG. 2, for example, depicts a viewer 33 and a lens 34.

The constitution of the digital still camera 1 has been described above. A DPOF file will be described below.

Figure 6:
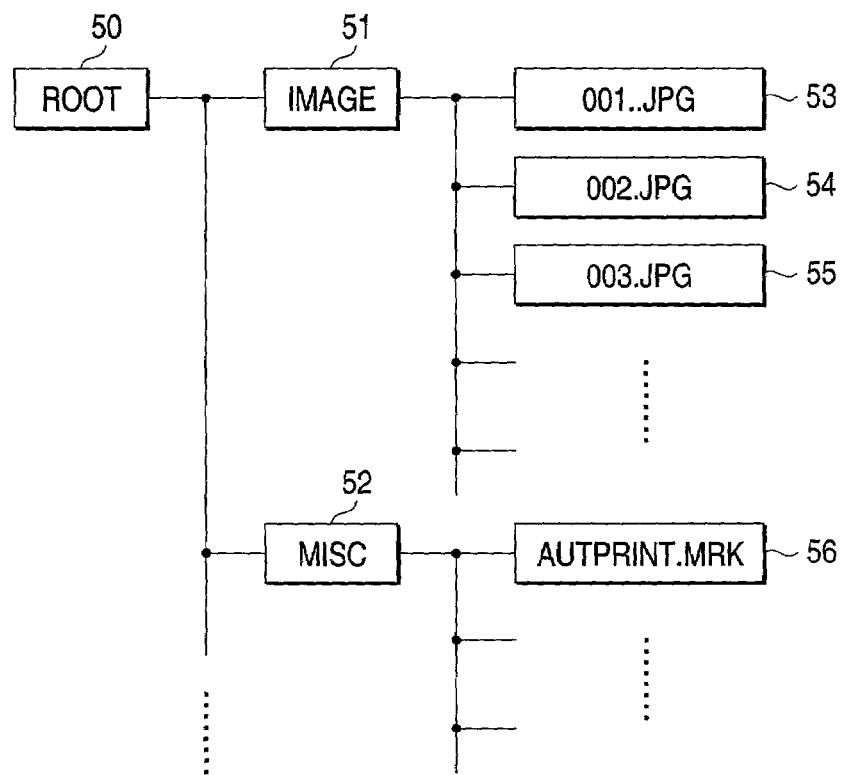
FIG. 6 is a typical tree diagram for explaining the directory structure for a DPOF file according to one embodiment of the invention.

The DPOF file generated or edited by operating the DPOF dedicated switch 41 is stored in an MISC directory made under the route directory of the removable memory 18, as shown in FIG. 6. The DPOF file is constituted by an automatic print file, an automatic transmission file, and an automatic reproduction file. The automatic print file will be described in the following. This invention is also applicable to the automatic transmission file and the automatic reproduction file, and its description is described later.

Figure 7:
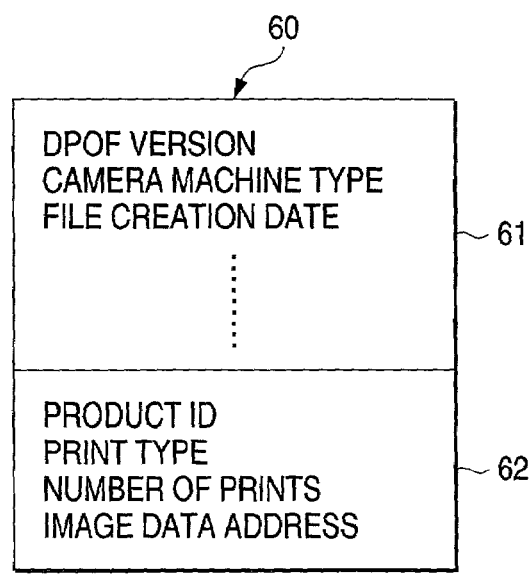
FIG. 7 is a typical diagram for explaining the contents of the DPOF file according to one embodiment of the invention.

The automatic print file 60 is constituted by a header portion 61 and a job description portion 62, as shown in FIG. 7. The header portion contains the version information of DPOF and the like. The job description portion contains the print type related with the product ID, the print number of sheets, and the path for image data. When printing, the preset data such as the print type and the print number of sheets described in the job description portion can be associated with the specific image data via the path for image data. Accordingly, an output device such as a printer can read a DPOF file to create a print job of the specific image data for each product ID in accordance with the print type and the print number of sheets, whereby there is no need of making the settings at the time of printing.

The DPOF dedicated switch 41 is effective when the digital still camera 1 is in the play mode to display the still image, in the photographing mode to make the basic play, immediately after capturing to display the captured still image, or in the automatic frame feed mode to display the still image. That is, in any of the above modes, when the DPOF dedicated switch 41 is depressed during execution of each module for implementing these functions, a DPOF setting module is started.

Figure 8:
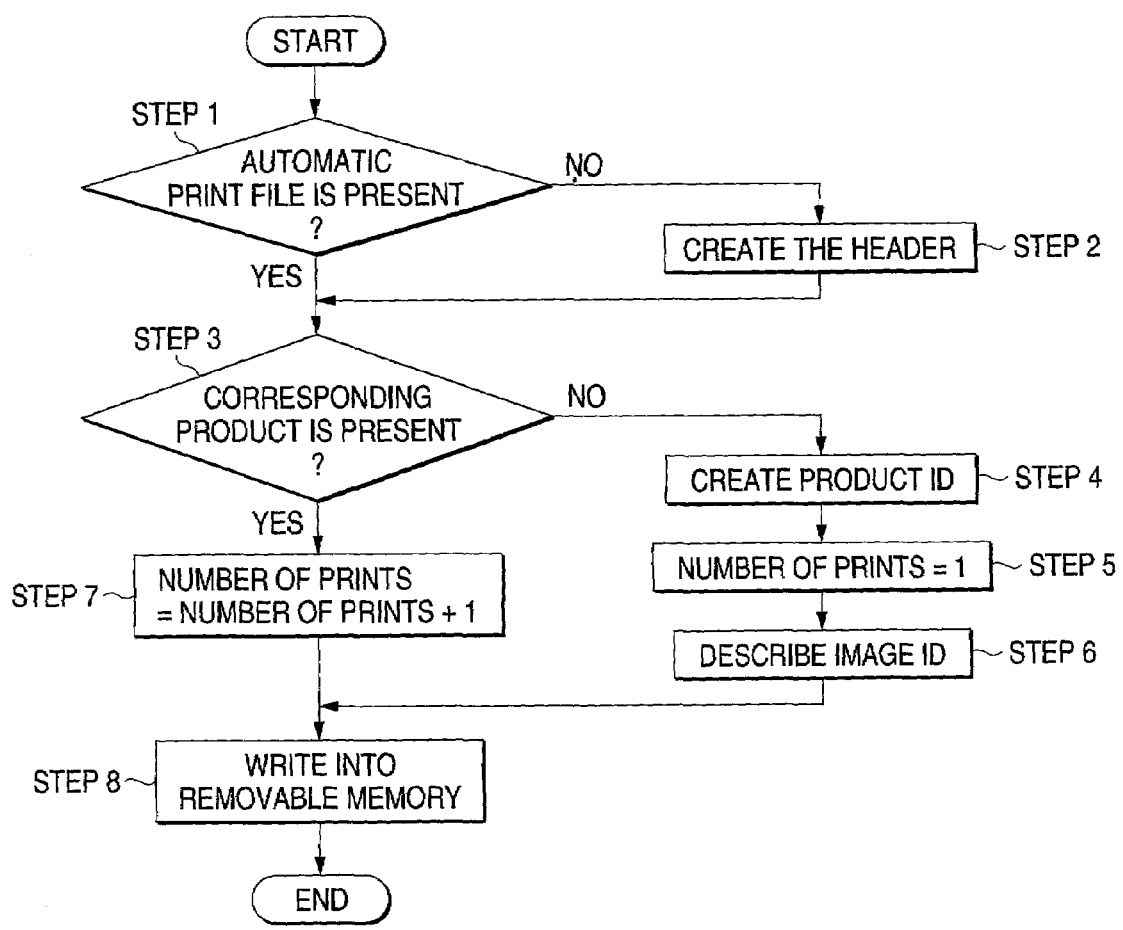
FIG. 8 is a flowchart showing the operation of the digital still camera according to one embodiment of the invention.

The DPOF setting module operates the digital still camera in accordance with a flowchart as shown in FIG. 8. At STEP1, determination is made whether or not an automatic print file is memorized in the MS 19. If no automatic print file is memorized in the removable memory 18, the data for the header portion is generated at STEP2, and stored in a predetermined area of the MS 19.

At STEP3, the job description portion of the automatic print file is retrieved to determine whether or not there is any product associated with the image data displayed on the LCD 38 at present. The ID assigned to an image file associates the image data displayed on the LCD 38 at present with the product, when the image file is stored in the removable memory 18, for example. The presence or absence of the product associated with the image data may be determined in such a manner as to hold the file ID of image data displayed on the LCD 38 in the MS 19, and the file ID of an image file for each product, and retrieve the job description portion with the file ID of image data displayed on the LCD 38 as a retrieval key.

If the product associated with the image data displayed on the LCD 38 at present is not present in the job description portion, a new product is created at STEP4. That is, the product ID which is not identical with other product IDs is generated, and stored in a predetermined area of the MS 19. At STEPS, the print number of sheets for its product ID is set to 1. Then, at STEP6, the file ID of image data displayed on the LCD 38 at present is stored. If the product associated with the image data displayed on the LCD 38 at present is present in the job description portion, the print number of sheets is incremented by one at STEP7. STEPs 4, 5, 6 and 7 are set forth as separate steps in succession for convenience sake, but these steps are not necessarily divided explicitly, and may be provided as one step or in another sequence, or provided with different order. In essence, if the product associated with the image data displayed on the LCD 38 at present already exists, the print number of sheets is incremented by one, or otherwise is set to 1. It is desirable that the set print number of sheets is displayed on the LCD 38.

At STEP 8, the preset information stored in the MS 19, namely, the automatic print file, is stored in the removable memory 18. At this time, the automatic print file is not deleted from the MS 19, and a copy of the automatic print file stored in the removable memory 18 is saved in the MS 19. In this manner, the period from the time of operating the DPOF dedicated switch 41 to the time of completion of editing the OPOF file can be shortened. A copy of the DPOF file stored in the MS 19 may be deleted to utilize the memory capacity of the MS 19 efficiently when the mode shifts to a mode of displaying the image of the subject formed in the area sensor 12 on the LCD 38 in real time. If deleted, the copy may be saved in the MS 19 by calling the DPOF file from the removable memory 18 prior to operating the DPOF dedicated switch 41, when the mode shifts to the mode of displaying the still image on the LCD 38. Thereby, even when the DPOF dedicated switch 41 is operated after the mode shifts to a mode of editing the DPOF file, the period from the time of operation to the time of completion of thing the DPOF file can be shortened.

The above operation for creating and editing the automatic print file at STEP1 to STEP8 can be performed by only depressing the DPOF dedicated switch 41, as shown in FIG. 1. That is, when the digital still camera 1 is in the play mode to display the still image, in the photographing mode to make the basic play or immediately after photographing to display the captured still image, or in the automatic frame feed mode to display the still image, printing the image data displayed on the LCD 38 and the print number or incrementing the print number by one can be specified only by depressing the DPOF dedicated switch 41. For example, if the DPOF dedicated switch 41 is firstly depressed while the still image is being displayed in the play mode, the print number of the image data being displayed is set to one, and if the DPOF dedicated switch 41 is depressed successively without changing the display image, the print number of the image data is set to two. Since the mode is not changed before and after the DPOF dedicated switch 41 is depressed, if the still image is being displayed in the automatic frame feed mode immediately before the DPOF switch 41 is depressed, the frame feed is continued in that mode, even after the DPOF dedicated switch 41 is depressed.

Accordingly, with the digital still camera 1 according to the embodiment, the input or edit of the print specification and specification of the number of prints for the image data can be accepted by one operation of the DPOF dedicated switch when the image data is displayed on the LCD 38, therefore the preset data regarding the image data is easily designated. With the digital still camera 1 according to this embodiment, the DPOF dedicated switch 41 is constituted by the push button switch, which is provided on the back face of the digital still camera 1 on the left with respect to the LCD 38, therefore it is easy to operate the DPOF dedicated switch 41 while holding the digital still camera 1. The digital still camera 1 according to this embodiment, since the automatic print file is not deleted from the MS 19, and a copy of the automatic print file stored in the removable memory 18 is saved in the MS 19, the period from the time when the DPOF dedicated switch 41 is operated to the time of completion of editing the automatic print file can be shortened.

The DPOF files such as the automatic transmission file and the automatic reproduction file other than the automatic print file, to which the invention is applied, will be described below.

For the automatic transmission file, it suffices that a product for specifying the transmission for the image data displayed on the LCD 38 may be created by depressing the DPOF dedicated switch 41. The transmission destination maybe input by operating a switch other than the DPOF dedicated switch 41 in the digital still camera 1, or input from the system using the DPOF dedicated file. For the automatic reproduction file, it suffices that a product for specifying the reproduction for the image data displayed on the LCD 38 may be created by depressing the DPOF dedicated switch 41. The order of reproduction may be the order in which the DPOF dedicated switch is depressed, or specified in accordance with the number of depressing the DPOF switch 41.

What is claimed is:

1. A digital camera comprising:
   an input unit for inputting image data;
   a first storing unit for storing the image data in a nonvolatile recording medium in a predetermined file format;
   a display unit for displaying the image data stored in the nonvolatile recording medium;
   a dedicated interface unit for accepting input or edit of a preset data regarding the in age data by one operation when the image data stored in the nonvolatile recording medium is displayed on the display unit; and
   a second storing unit for storing the preset data with the image data in the nonvolatile recording medium in a predetermined file format.

2. The digital camera according to claim 1, wherein the preset data as data for setting number of printing the image data displayed on the display unit.

3. The digital still camera according to claim 2, wherein the dedicated interface unit increments the number of printing the image data displayed on the display unit for every operation.

4. The digital camera according to claim 1, wherein the dedicated interface unit comprises a push button switch.

5. The digital camera according to claim 4, wherein the push button switch is provided on the left from the display unit.

6. The digital camera according to claim 1 further comprising a memory unit for staring a copy of the preset data stored in the nonvolatile recording medium at least during a period for which said dedicated interface unit can accept the input or edit of the preset data.

7. The digital camera according to claim 6, wherein the memory unit comprises a memory device for storing the copy of the preset data and a CPU for controlling storing and deleting of the copy of the preset data into the memory device.

8. The digital camera according to claim 7, wherein the memory device temporarily stores the image data and respective reduced image data generated by the CPU and wherein the preset data relates to the image data and the respective reduced image data.

9. The digital camera according to claim 4, wherein for accepting input or edit of the preset data, the dedicated interface consists of the push button switch.

10. The digital camera according to claim 1, wherein the dedicated interface unit is operable to accept the input or edit of the preset data in any mode of the digital came a when the image data is displayed.

11. The digital camera according to claim 10, wherein said any mode comprises at least one of: a play mode and a photographing mode.

12. The digital camera according to claim 1, wherein the input or edit of the preset data is performed with a single operation, the single operation comprising one of: pushing a push button or rotating a dial, and wherein the dedicated interface comprises of the button or the dial.

13. The digital camera according to claim 1, wherein the dedicated interlace unit accepts the input or the edit of the preset data without switching the digital camera to at input or an edit mode.

14. A digital camera comprising:
    an input unit for inputting image data;
    a first storing unit for storing the inputted image data in a nonvolatile recording medium in a predetermined file format;
    a display unit for displaying the image data stored in the nonvolatile recording medium; and
    a dedicated interface unit comprising a dial or a button for accepting input or edit of a preset data relating to the image data,
    wherein a user edits or inputs the preset data by a single rotation of the dial or a single push of the button without changing or disrupting the displayed image data.

15. The digital camera according to claim 14, further comprising: a second storing unit for storing the preset data with the image data in the nonvolatile recording medium in a predetermined file format, wherein when the user executes the single rotation or the single push, the present data for printing, transmitting, or reproducing is automatically stored.

16. The digital camera according to claim 14, further comprising: a record storing unit for storing the preset data with the image data in the nonvolatile recording medium in a predetermined file format, wherein whet the user executes the single rotation or the single push, the digital camera automatically executes the following steps:

checks whether the image data wit its respective preset data in the predetermined format is present in the memory unit, checks whether the image data has a unique identification number, and sets a number of prints to one or increments the number of prints of the image data by one.

* * * * *

UNITED STATES PATENT AND TRADEMARK OFFICE
CERTIFICATE OF CORRECTION

PATENT NO. : 7,053,931 B2 Page 1 of 1
APPLICATION NO. : 10/052911
DATED : May 30, 2006
INVENTOR(S) : Nishi et al.

It is certified that error appears in the above-identified patent and that said Letters Patent is hereby corrected as shown below:

In column 7, line 65, replace "in age" with --image--.

Signed and Sealed this

Twenty-seventh Day of February, 2007

JON W. DUDAS
*Director of the United States Patent and Trademark Office*